United States Patent
Kim et al.

(10) Patent No.: US 10,338,711 B2
(45) Date of Patent: Jul. 2, 2019

(54) DISPLAY DEVICE, METHOD OF DRIVING THE SAME, AND DRIVING CIRCUIT THEREOF

(71) Applicant: LG DISPLAY CO., LTD., Seoul (KR)

(72) Inventors: Hongchul Kim, Gunpo-si (KR); Cheolse Kim, Dalseo-gu (KR)

(73) Assignee: LG Display Co., Ltd., Seoul (KR)

(*) Notice: Subject to any disclaimer, the term of this patent is extended or adjusted under 35 U.S.C. 154(b) by 232 days.

(21) Appl. No.: 15/365,655

(22) Filed: Nov. 30, 2016

(65) Prior Publication Data

US 2017/0153736 A1  Jun. 1, 2017

(30) Foreign Application Priority Data

Dec. 1, 2015 (KR) .................... 10-2015-0169913

(51) Int. Cl.
  *G09G 3/36* (2006.01)
  *G06F 3/041* (2006.01)
  *G06F 3/044* (2006.01)

(52) U.S. Cl.
  CPC ............ *G06F 3/0412* (2013.01); *G06F 3/044* (2013.01); *G06F 3/0416* (2013.01); *G09G 3/3655* (2013.01); *G09G 3/3677* (2013.01); *G09G 2310/08* (2013.01); *G09G 2330/021* (2013.01); *G09G 2340/0435* (2013.01); *G09G 2354/00* (2013.01)

(58) Field of Classification Search
  CPC ...... G06F 3/0412; G06F 3/0416; G06F 3/044; G09G 3/3677; G09G 3/3655; G09G 2354/00; G09G 2340/0435; G09G 2330/021; G09G 2310/08
  See application file for complete search history.

(56) References Cited

U.S. PATENT DOCUMENTS

| | | | |
|---|---|---|---|
| 2012/0001954 A1* | 1/2012 | Yamazaki | G09G 3/3406 345/690 |
| 2012/0050217 A1* | 3/2012 | Noguchi | G06F 3/0412 345/174 |
| 2013/0194194 A1* | 8/2013 | Van Eerd | G06F 3/041 345/173 |
| 2013/0285952 A1* | 10/2013 | Huang | G09G 3/3611 345/173 |
| 2014/0132560 A1* | 5/2014 | Huang | G06F 3/044 345/174 |

(Continued)

*Primary Examiner* — Nitin Patel
*Assistant Examiner* — Amy Onyekaba
(74) *Attorney, Agent, or Firm* — Seed Intellectual Property Law Group LLP

(57) ABSTRACT

A display device, a method of driving the same, and a driving circuit of the display device are discussed. The display device includes a display panel including a pixel array, in which touch sensors are embedded, a timing generator that determines a normal driving mode and a low-speed driving mode based on a mode control signal and generates a first touch sync signal in the low-speed driving mode, a display driver writing pixel data to the pixel array in response to the first touch sync signal only in the display periods of the data write frames in the low-speed driving mode, and a touch driver driving the touch sensors in response to the first touch sync signal in the touch periods of the data write frames and at least a portion of the data hold frame in the low-speed driving mode.

23 Claims, 12 Drawing Sheets

(56) References Cited

U.S. PATENT DOCUMENTS

| | | | | |
|---|---|---|---|---|
| 2014/0168149 A1* | 6/2014 | Han | ............... | G06F 3/0412 345/174 |
| 2014/0191989 A1* | 7/2014 | Saitoh | ............... | G09G 3/3614 345/173 |
| 2014/0240617 A1* | 8/2014 | Fukutome | ............... | G02F 1/13338 349/12 |
| 2014/0320446 A1* | 10/2014 | Kim | ............... | G06F 3/044 345/174 |
| 2014/0354590 A1* | 12/2014 | Wang | ............... | G06F 3/044 345/174 |
| 2014/0362042 A1* | 12/2014 | Noguchi | ............... | G06F 3/0412 345/174 |
| 2015/0138173 A1* | 5/2015 | Bae | ............... | G06F 3/044 345/205 |
| 2015/0187308 A1* | 7/2015 | Shin | ............... | G09G 3/3614 345/209 |
| 2015/0187334 A1* | 7/2015 | Oh | ............... | G09G 3/2025 345/204 |
| 2015/0261259 A1* | 9/2015 | Endo | ............... | G06F 1/1652 361/679.06 |
| 2016/0125785 A1* | 5/2016 | Wang | ............... | G09G 5/001 345/582 |

* cited by examiner

DISPLAY DEVICE, METHOD OF DRIVING THE SAME, AND DRIVING CIRCUIT THEREOF

This application claims the benefit of Korean Patent Application No. 10-2015-0169913 filed on Dec. 1, 2015, which is incorporated herein by reference for all purposes as if fully set forth herein.

BACKGROUND OF THE DISCLOSURE

Field of the Disclosure

The present disclosure relates to a display device capable of performing a touch sensing, a method of driving the display device, and a driving circuit of the display device.

Discussion of the Related Art

User interface (UI) is configured so that users are able to communicate with various electronic devices and thus can easily and comfortably control the electronic devices as they desire. Examples of the user interface include a keypad, a keyboard, a mouse, an on-screen display (OSD), and a remote controller having an infrared communication function or a radio frequency (RF) communication function. User interface technology has continuously expanded to increase user's sensibility and handling convenience. The user interface has been recently developed to include touch UI, voice recognition UI, 3D UI, etc.

The touch UI has been necessarily adopted to portable information appliances. The touch UI is implemented by forming a touch screen on the screen of a display device. The touch screen may be implemented as a capacitive touch screen. The touch screen having capacitive touch sensors senses changes (i.e., changes in charges of the touch sensor) in a capacitance resulting from an input of a touch driving signal when a user touches (or approaches) the touch sensor with his or her finger or a conductive material, and thus detects a touch input.

In order to increase touch sensitivity of the capacitive touch screen the user feels, it is necessary to increase a touch report rate. This is because coordinates of the touch input are updated using a frequency of the touch report rate in a host system. Thus, a response time of the host system in response to the touch input is proportional to the touch report rate.

In an in-cell touch sensor technology in which touch sensors of a touch screen are embedded in a pixel array of a display panel, the touch report rate is determined based on a display frame rate. The touch report rate indicates a frequency at which coordinate data obtained by sensing all of the touch sensors included in the touch screen is transmitted to an external host system. The display frame rate indicates a frequency at which all of pixels of the display panel are updated to new data. As the touch report rate increases, a time required to update coordinates of a touch input is reduced. Therefore, the touch sensitivity of the touch screen the user feels can be improved, and a touch input trace can be represented in detail.

When there is little change in an input image on the display device, a technology of changing the display frame rate is known to reduce power consumption of the display device. The technology drives a display device in a low-speed driving mode when the display device, that generally operates in a normal driving mode, meets previously determined low-speed driving conditions. The technology is known as a low refresh rate (LRR) technology.

However, because a refresh cycle of pixel data is longer in the low-speed driving mode than in the normal driving mode, a display frame rate in the low-speed driving mode decreases, and a touch report rate in the low-speed driving mode also decrease. With reference to FIGS. 1A and 1B, this is described in detail below. In FIGS. 1A and 1B, a display frame rate in a normal driving mode is 60 Hz, and a display frame rate in a low-speed driving mode is 20 Hz, by way of example.

In an in-cell touch sensor technology, as shown in FIG. 1A, one display frame period may include one display period Td and one touch period Tt. Alternatively, as shown in FIG. 1B, one display frame period may include a plurality of display periods Td and a plurality of touch periods Tt. The display frame period includes only data write frames WF in the normal driving mode and includes data write frames WF and data hold frames HF in the low-speed driving mode. In the display period Td of the data write frame WF, a write operation D (hereinafter, referred to as "data write operation") of pixel data is performed. In the touch period Tt of the data write frame WF, an operation T (hereinafter, referred to as "touch operation") driving touch sensors is performed. On the other hand, in the data hold frame HF, both the data write operation D and the touch operation T are not performed. Thus, a touch report rate is less in the low-speed driving mode including the data hold frame HF than in the normal driving mode. A reduction in the touch report rate in the low-speed driving mode may lead to a large reduction in a touch performance including a reduction in a touch response speed, a cut phenomenon of a touch input trace, etc.

SUMMARY OF THE DISCLOSURE

The present disclosure provides a display device capable of preventing a reduction in a touch performance resulting from changes in a display frame rate, a method of driving the display device, and a driving circuit of the display device.

In one aspect, there is provided a display device including a display panel including a pixel array, in which touch sensors are embedded; a timing generator configured to determine a normal driving mode and a low-speed driving mode based on a mode control signal and generate a first touch sync signal defining a display period and a touch period in the low-speed driving mode, in which at least one data hold frame is present between data write frames; a display driver configured to write pixel data to the pixel array in response to the first touch sync signal only in the display periods of the data write frames except the data hold frame in the low-speed driving mode; and a touch driver configured to drive the touch sensors in response to the first touch sync signal in the touch periods of the data write frames and at least a portion of the data hold frame in the low-speed driving mode.

The touch driver drives the touch sensors in response to the first touch sync signal in the touch period of the data hold frame in the low-speed driving mode.

The touch driver drives the touch sensors in response to the first touch sync signal in an entire duration of the data hold frame in the low-speed driving mode.

In the low-speed driving mode, the timing generator generates the first touch sync signal based on external clock information received from an external host system, or based on internal clock information that is generated by itself.

The timing generator generates a second touch sync signal defining the display period and the touch period in the normal driving mode, in which only the data write frames are present. The display driver writes the pixel data to the pixel array in response to the second touch sync signal in the display periods of the data write frames in the normal driving mode. The touch driver drives the touch sensors in response to the second touch sync signal in the touch periods of the data write frames in the normal driving mode.

The data hold frame includes at least one display period, in which the pixel data is not written, and at least one touch period in response to the first touch sync signal.

The timing generator controls a touch report rate in the low-speed driving mode to be greater than a display frame rate in the low-speed driving mode.

The timing generator controls a touch report rate in the low-speed driving mode to be equal to or greater than a display frame rate in the normal driving mode.

In another aspect, there is provided a driving circuit of a display device including a display panel including a pixel array, in which touch sensors are embedded, the driving circuit including a timing generator configured to determine a normal driving mode and a low-speed driving mode based on a mode control signal and generate a first touch sync signal defining a display period and a touch period in the low-speed driving mode, in which at least one data hold frame is present between data write frames; a display driver configured to write pixel data to the pixel array in response to the first touch sync signal only in the display periods of the data write frames except the data hold frame in the low-speed driving mode; and a touch driver configured to drive the touch sensors in response to the first touch sync signal in the touch periods of the data write frames and at least a portion of the data hold frame in the low-speed driving mode.

In yet another aspect, there is provided a method of driving a display device including a display panel including a pixel array, in which touch sensors are embedded, the method including determining a normal driving mode and a low-speed driving mode based on a mode control signal and generating a first touch sync signal defining a display period and a touch period in the low-speed driving mode, in which at least one data hold frame is present between data write frames; writing pixel data to the pixel array in response to the first touch sync signal only in the display periods of the data write frames except the data hold frame in the low-speed driving mode; and driving the touch sensors in response to the first touch sync signal in the touch periods of the data write frames and at least a portion of the data hold frame in the low-speed driving mode.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION OF THE ILLUSTRATED EMBODIMENTS

Reference will now be made in detail to embodiments of the disclosure, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the disclosure.

Figure 1A:
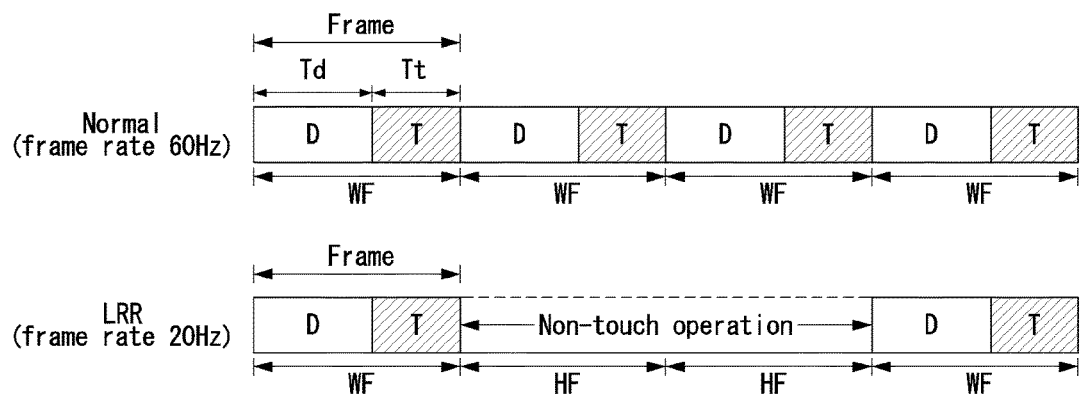
FIGS. 1A and 1B illustrate examples of a data write operation and a touch operation in each of a normal driving mode and a low-speed driving mode in an in-cell touch sensor technology according to a related art.
Figure 1B:
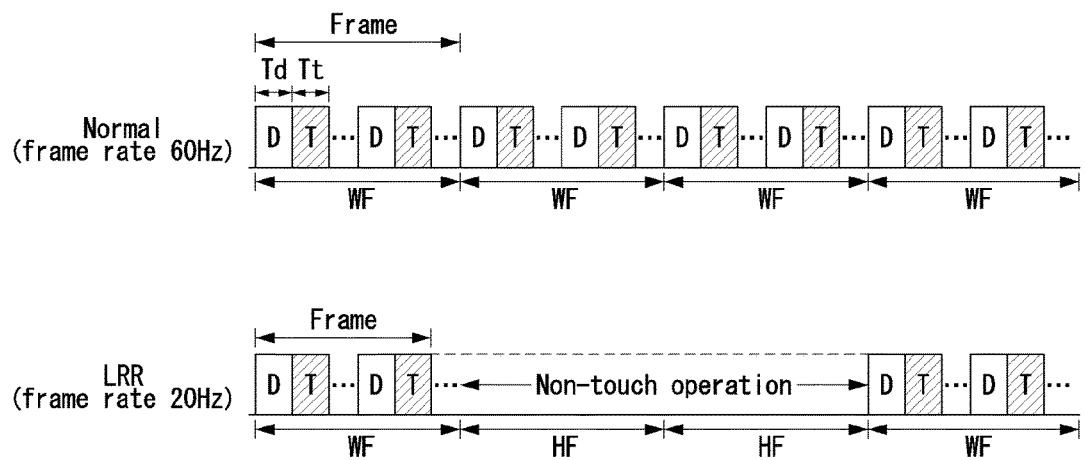
Figure 2:
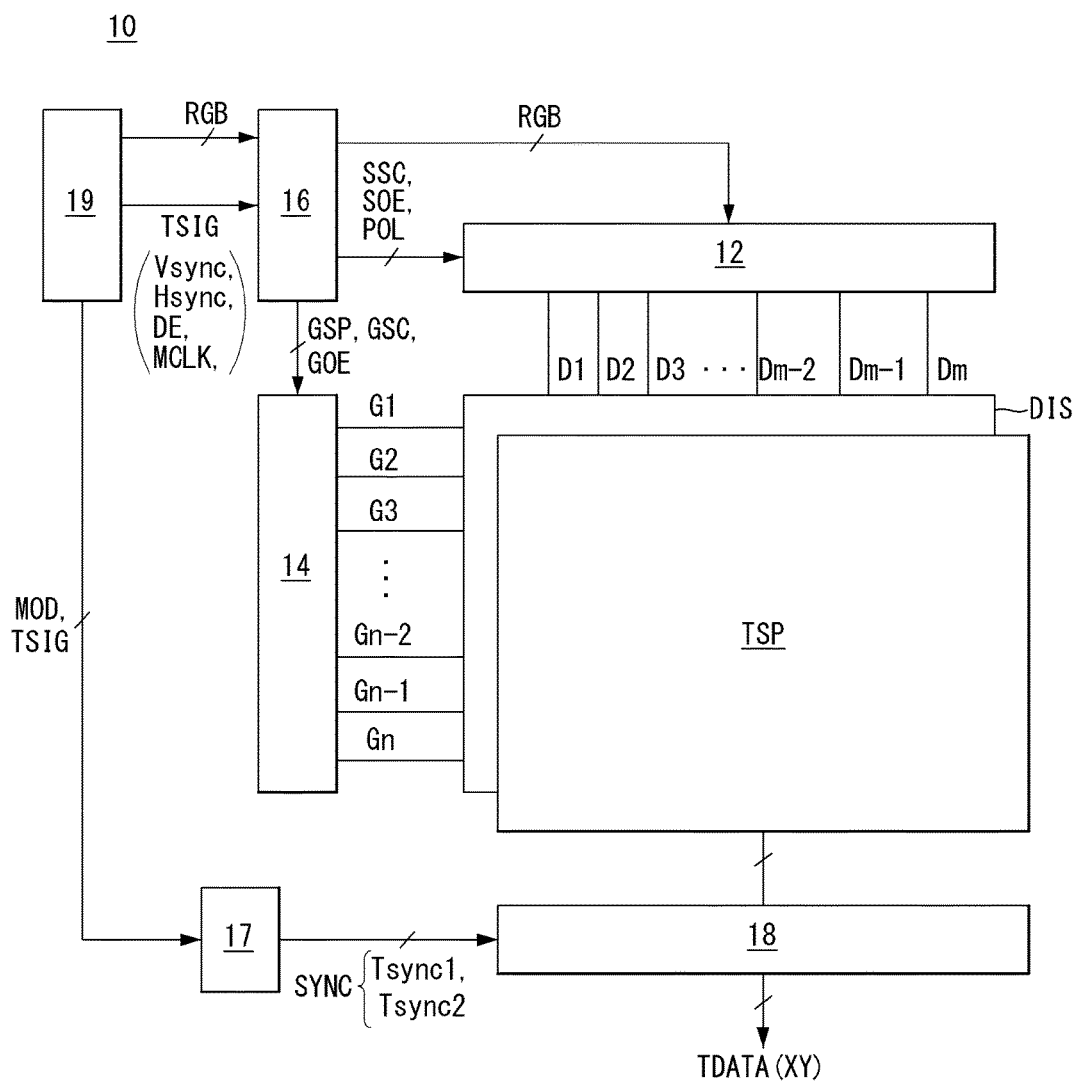
FIG. 2 illustrates a display device according to an embodiment of the disclosure.
Figure 3:
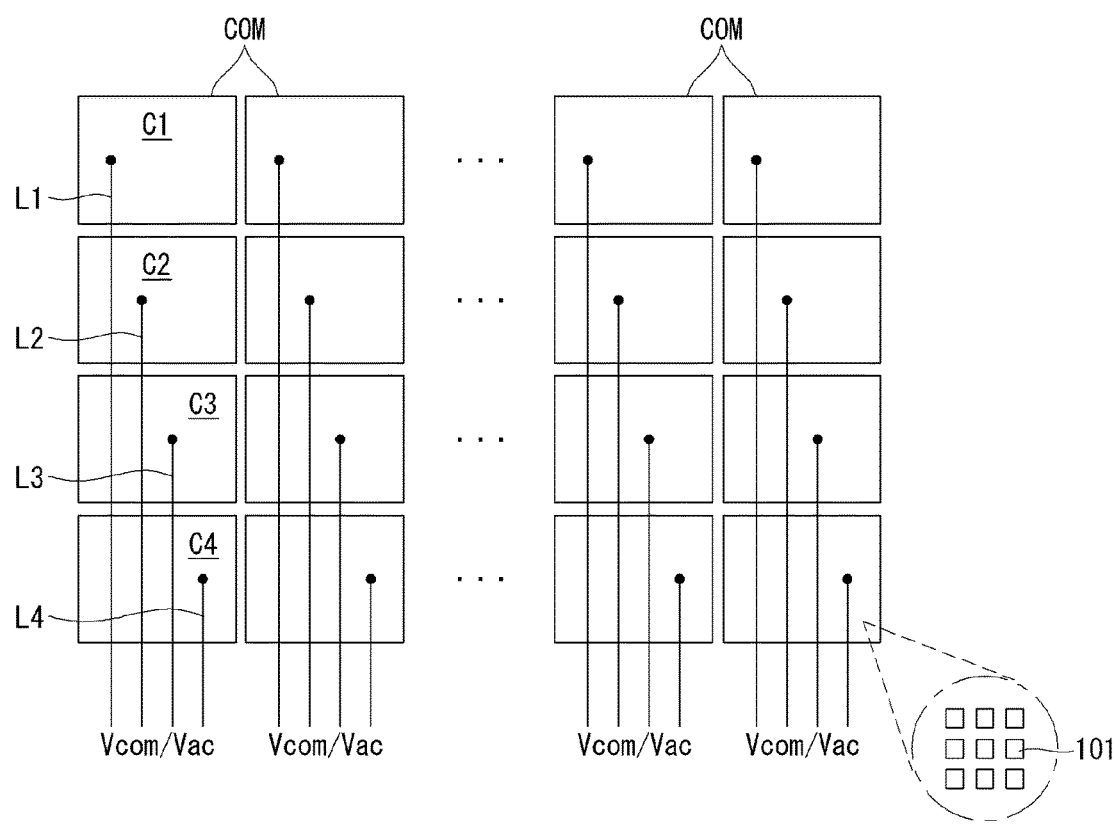
FIG. 3 illustrates an example of a touch sensor embedded in a pixel array.
Figure 4:
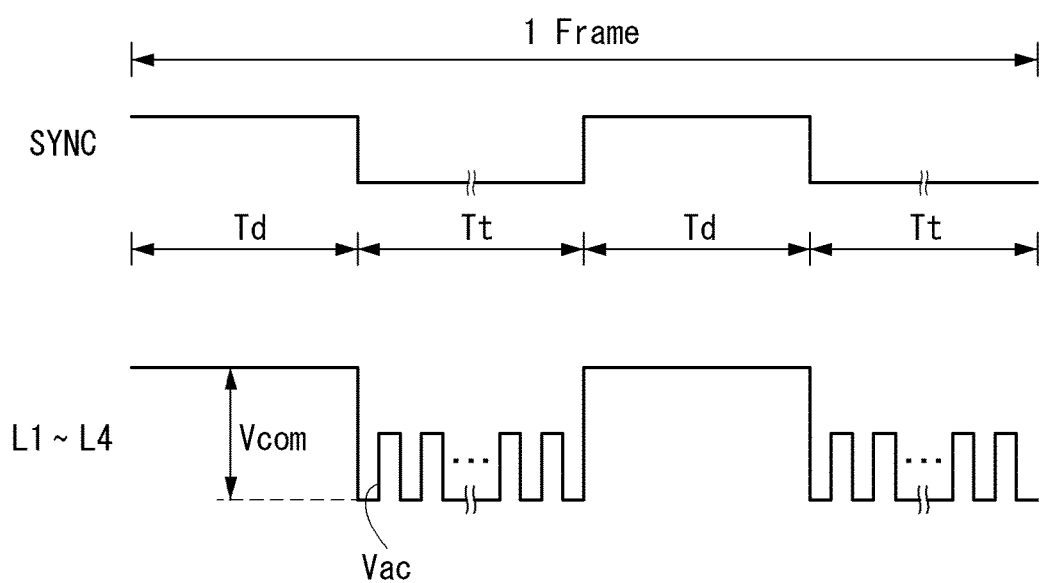
FIG. 4 is a timing diagram illustrating a method of time-division driving pixels and touch sensors of a display panel shown in FIG. 3.
Figure 5:
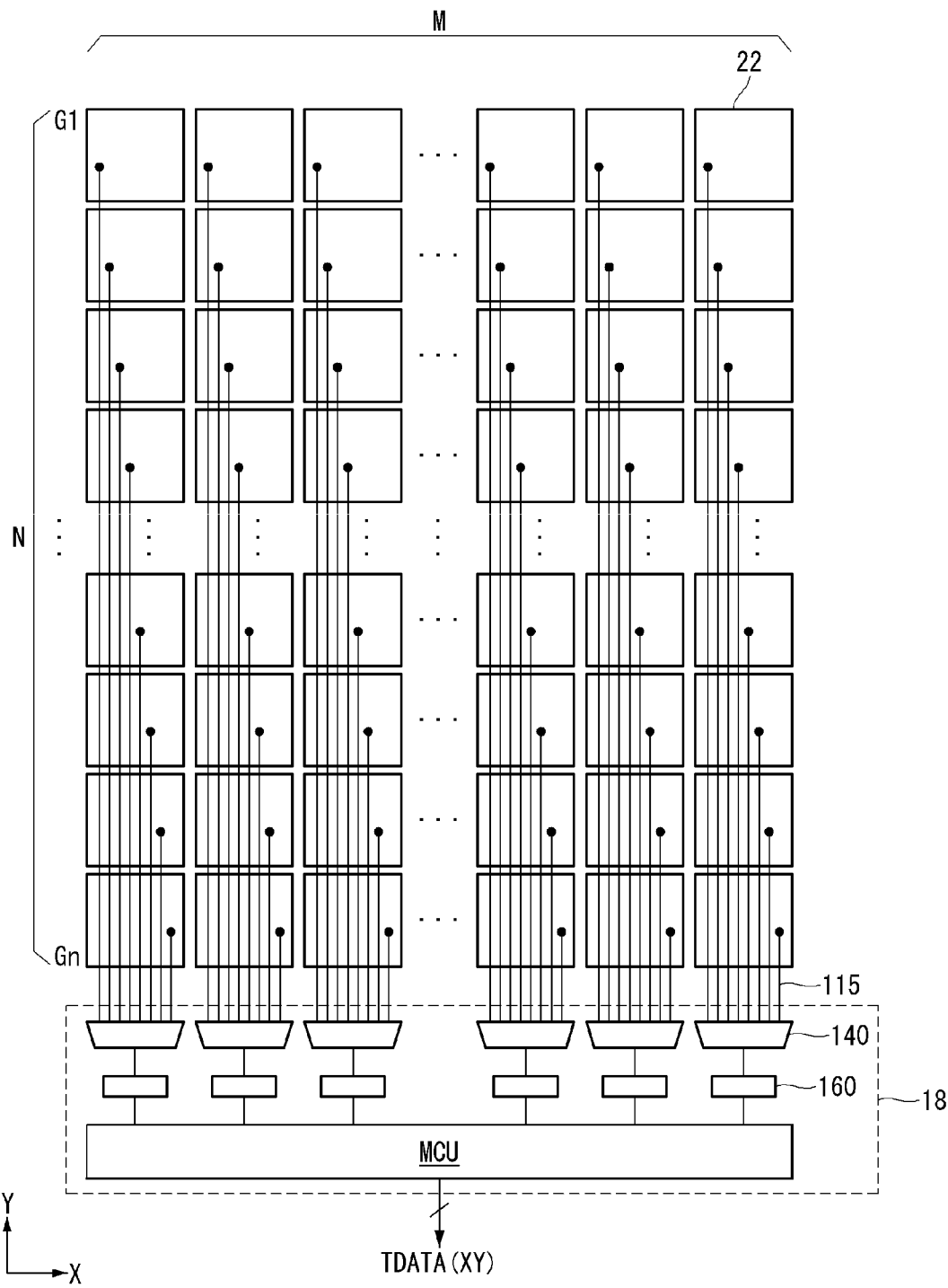
FIG. 5 illustrates multiplexers connected to touch sensor blocks and sensing units.
Figure 6:
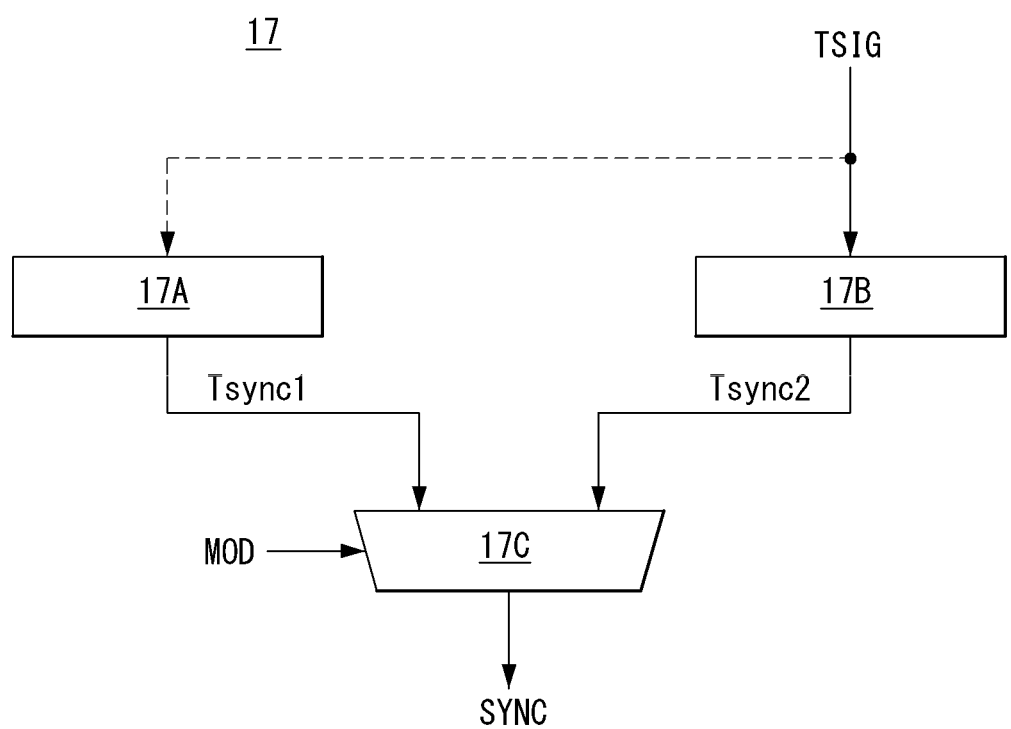
FIG. 6 illustrates further details of a timing generator shown in FIG. 2.

FIG. 2 illustrates a display device including a touch driving device according to an embodiment of the disclosure. FIG. 3 illustrates an example of a touch sensor embedded in a pixel array. FIG. 4 is a timing diagram illustrating a method of time-division driving pixels and touch sensors of a display panel shown in FIG. 3. FIG. 5 illustrates multiplexers connected to touch sensor blocks and sensing units. FIG. 6 illustrates a timing generator shown in FIG. 2;

Referring to FIGS. 2 to 6, a display device 10 according to an embodiment of the disclosure may be implemented based on a flat panel display, such as a liquid crystal display (LCD), a field emission display (FED), a plasma display panel (PDP), an organic light emitting diode (OLED) display, and an electrophoresis display (EPD). In the following description, the embodiment of the disclosure will be described using the liquid crystal display as an example of the flat panel display. Other flat panel displays may be used.

The display device 10 includes a display module and a touch module.

The touch module includes a touch screen TSP, a timing generator 17, and a touch driver 18.

The touch screen TSP may be implemented in a capacitive manner of sensing a touch input through a plurality of capacitive sensors. The touch screen TSP includes a plurality of touch sensors each having a capacitance. The capacitance may be divided into a self-capacitance and a mutual capacitance. The self-capacitance may be formed along a conductor line of a single layer formed in one direction, and the mutual capacitance may be formed between two conductor lines perpendicular to each other.

The touch sensors of the touch screen TSP may be embedded in a pixel array of a display panel DIS. FIG. 3 illustrates an example where the touch screen TSP is embedded in the pixel array of the display panel DIS. Referring to FIG. 3, the pixel array of the display panel DIS includes touch sensors C1 to C4 and sensor lines L1 to Li connected to the touch sensors C1 to C4, where "i" is a positive integer. A common electrode COM of a plurality of pixels 101 is divided into a plurality of segments. The touch sensors C1 to C4 are implemented as the divided common electrodes COM. One common electrode segment is commonly connected to the plurality of pixels 101 and forms one touch sensor. Thus, as shown in FIG. 4, the touch sensors C1 to C4 supply a common voltage Vcom to the pixels 101 during a display period Td. During a touch period Tt, the touch sensors C1 to C4 receive a touch driving signal Vac and sense a touch input. FIG. 3 illustrates self-capacitance touch sensors by way of example. Other types of touch sensors may be used for the touch sensors C1 to C4.

The touch driver 18 drives the touch sensors in response to a touch sync signal Tsync received from the timing generator 17 during the touch period Tt. During the touch period Tt, the touch driver 18 supplies the touch driving signal Vac to the touch sensors C1 to C4 through the sensor lines L1 to Li and senses a touch input. The touch driver 18 analyzes a change in charges of the touch sensor depending on whether or not there is a touch input, determines the touch input, and calculates location coordinates of the touch input. To this end, as shown in FIG. 5, the touch driver 18 may include multiplexers 140, sensing units 160, and a microcontroller unit MCU.

The multiplexer 140 floats touch sensor electrodes 22 accessed by the sensing unit 160 under the control of the microcontroller unit MCU. The multiplexer 140 may supply the common voltage Vcom under the control of the microcontroller unit MCU. When a resolution of the touch screen TSP is M×N, where M and N are a positive integer equal to or greater than 2, the number of multiplexers 140 required for the resolution is M. When the resolution of the touch screen TSP is M×N, the touch sensor electrodes 22 are divided into M×N. Each multiplexer 140 is connected to the N touch sensor electrodes 22 through N sensor lines 115 and sequentially connects the N sensor lines 115 to one sensing unit 160.

The sensing unit 160 is connected to the sensor lines 115 through the multiplexer 140. When there is a change in a voltage of gate lines, the sensing unit 160 measures a change in a waveform of a voltage received from the touch sensor electrodes 22 and converts the change into digital data. The sensing unit 160 includes an amplifier amplifying the received voltages of the touch sensor electrodes 22, an integrator accumulating the amplified voltages of the amplifier, and an analog-to-digital converter (ADC) converting a voltage of the integrator into digital data. The digital data output from the ADC is touch raw data and is transmitted to the microcontroller unit MCU. When the resolution of the touch screen TSP is M×N, the M sensing units 160 are necessary.

The sensing units 160 and the microcontroller unit MCU may transmit and receive signals through a serial peripheral interface (SPI). The microcontroller unit MCU compares the touch raw data with a predetermined threshold value and determines a touch input based on the result of a comparison. The microcontroller unit MCU executes a touch recognition algorithm calculating coordinates of the touch input. The microcontroller unit MCU transmits touch input coordinates TDATA to a host system 19.

The timing generator 17 determines a normal driving mode and a low-speed driving mode based on a mode control signal MOD from the host system 19. When the mode control signal MOD is input at a first logic level, the timing generator 17 may determine the input of the mode control signal MOD as the low-speed driving mode. When the mode control signal MOD is input at a second logic level, the timing generator 17 may determine the input of the mode control signal MOD as the normal driving mode. In the embodiment disclosed herein, the first logic level may be a high level, and the second logic level may be a low level, and vice versa.

The normal driving mode and the low-speed driving mode are determined depending on a display frame rate. When an input image has not changed during a predetermined number of frame periods (e.g., when a still image is input for more than a predetermined period of time), the low-speed driving mode is performed. The low-speed driving mode reduces a driving frequency, that enables the display device 10 to operate, and increases a data write cycle of the pixels, thereby reducing power consumption of the display device. A refresh rate, at which pixel data of the display panel DIS is updated, is less in the low-speed driving mode than in the normal driving mode. In other words, when a driving frequency in the normal driving mode is 60 Hz, a driving frequency in the low-speed driving mode is less than the driving frequency in the normal driving mode, for example, 30 Hz, 20 Hz, etc. The low-speed driving mode is not limited to when a still image is input. For example, the display device may operate in the low-speed driving mode when the display device operates in a standby mode or when a user command or an input image is not input to a display driver for more than a predetermined period of time.

Figure 8:
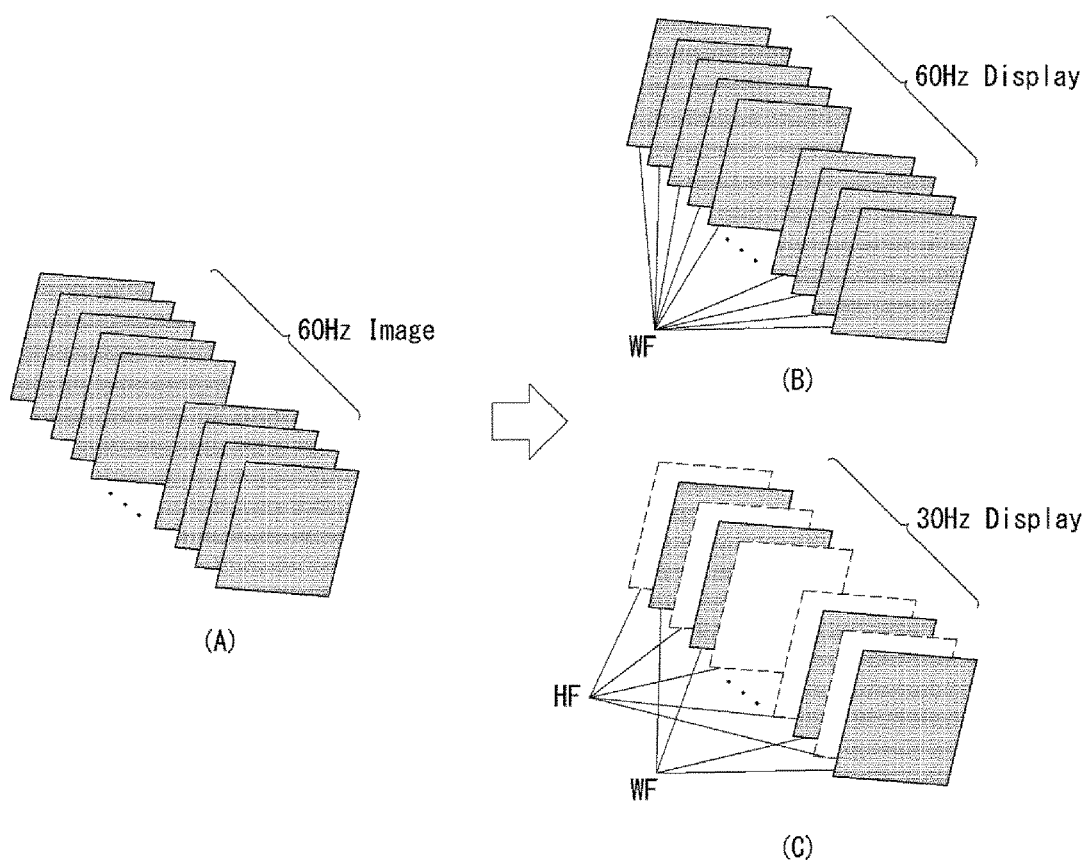
FIGS. 8 and 9 illustrate a normal driving mode and a low-speed driving mode.
Figure 9:
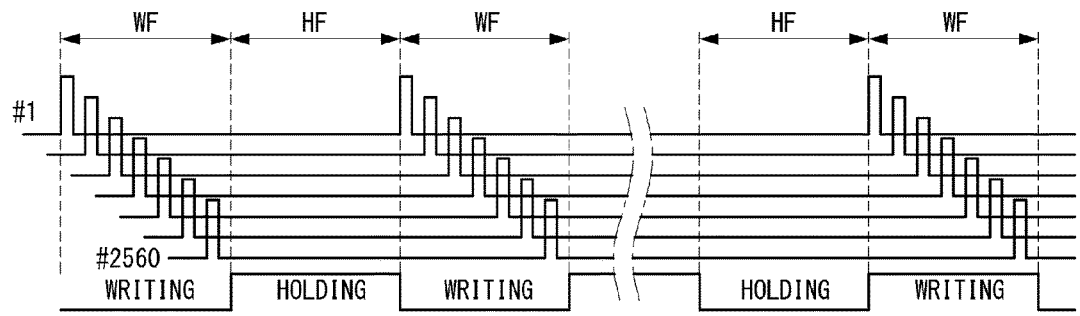

As shown in FIG. 8, a display frame includes only data write frames WF in the normal driving mode. On the other hand, in the low-speed driving mode, a display frame includes data write frames WF and data hold frames HF. As shown in FIG. 9, pixel data is written to the display panel DIS only in the data write frames WF. In the data hold frames HF, the pixel data written during the data write frames WF is held, and new pixel data is not written to the display panel DIS. Thus, as the number of data hold frames HF positioned between the adjacent data write frames WF increases, the display frame rate is reduced. For example, when a driving frequency in the normal driving mode is 60 Hz, a driving frequency in the low-speed driving mode, in which one data hold frame HF is present between every two adjacent data write frames WF, may be 30 Hz. Further, a driving frequency in the low-speed driving mode, in which two data hold frames HF are present between every two adjacent data write frames WF, may be 20 Hz. Further, a driving frequency in the low-speed driving mode, in which 59 data hold frames HF are present between every two adjacent data write frames WF, may be 1 Hz.

As shown in FIG. 6, the timing generator 17 includes a first timing generator 17A generating a first touch sync signal Tsync1, a second timing generator 17B generating a second touch sync signal Tsync2, and a selector 17C selectively outputting the first touch sync signal Tsync1 and the second touch sync signal Tsync2 in response to the mode control signal MOD.

Figure 7A:
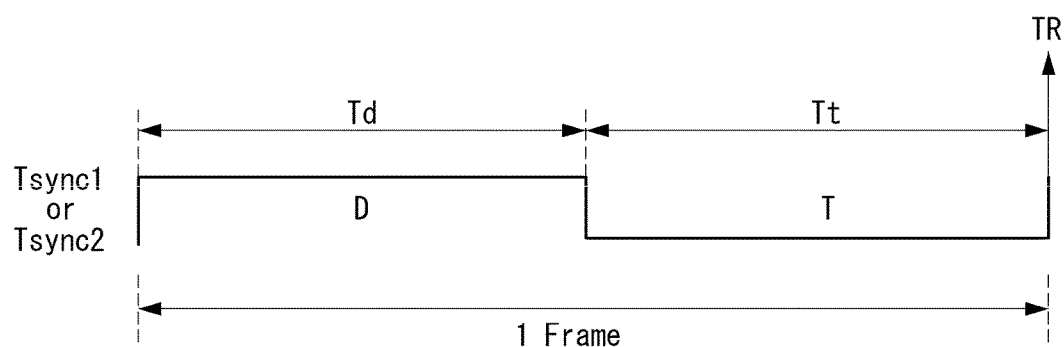
FIGS. 7A and 7B illustrate examples of a touch sync signal defining a display period and a touch period.
Figure 7B:
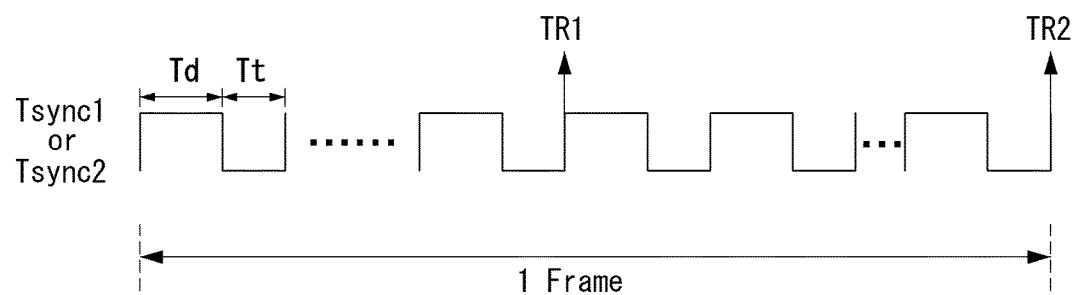

The first timing generator 17A operates in the low-speed driving mode and generates the first touch sync signal Tsync1 for defining a display period Td and a touch period Tt of one display frame period. The first timing generator 17A may generate the first touch sync signal Tsync1 based on an external clock MCLK of a timing signal TSIG received from the host system 19. The timing signal TSIG may include a vertical sync signal Vsync, a horizontal sync signal Hsync, a data enable signal DE, the external clock MCLK, etc. The host system 19 may transmit the minimum timing signal TSIG to the first timing generator 17A, so as to reduce power consumption in the low-speed driving mode. In this instance, the first timing generator 17A may generate the first touch sync signal Tsync1 based on only the external clock MCLK. The host system 19 may not transmit the timing signal TSIG to the first timing generator 17A, so as to further reduce power consumption in the low-speed driving mode. In this instance, the first timing generator 17A may generate the first touch sync signal Tsync1 based on an internal clock that is generated by itself. As shown in FIG. 7A, one display frame period may include one display period Td and one touch period Tt in response to the first touch sync signal Tsync1. Alternatively, as shown in FIG. 7B, one display frame period may include a plurality of display periods Td and a plurality of touch periods Tt in response to the first touch sync signal Tsync1.

The second timing generator 17B operates in the normal driving mode and generates the second touch sync signal Tsync2 for defining a display period Td and a touch period Tt of one display frame period. The second timing generator 17B may generate the second touch sync signal Tsync2 based on the timing signal TSIG, such as the vertical sync signal Vsync, the horizontal sync signal Hsync, the data enable signal DE, and the external clock MCLK, received from the host system 19.

The selector 17C outputs the first touch sync signal Tsync1 to the touch driver 18 in the low-speed driving mode and outputs the second touch sync signal Tsync2 to the touch driver 18 in the normal driving mode in response to the mode control signal MOD.

In the low-speed driving mode, the data write frame WF includes at least one display period Td, in which pixel data is written, and at least one touch period Tt, in which the touch sensors are driven, in response to the first touch sync signal Tsync1. Further, in the low-speed driving mode, the data hold frame HF includes at least one display period Td, in which pixel data is not written, and at least one touch period Tt, in which the touch sensors are driven, in response to the first touch sync signal Tsync1. In the data hold frame HF of the low-speed driving mode, the touch sensors may be driven only in the touch period Tt (referring to FIGS. 10 and 11) and also may be driven in the display period Td as well as the touch period Tt (referring to FIGS. 12 and 13).

In the normal driving mode, the data write frame WF includes at least one display period Td, in which pixel data is written, and at least one touch period Tt, in which the touch sensors are driven, in response to the second touch sync signal Tsync2.

The display module may include the display panel DIS, a display driver (12, 14, and 16), and the host system 19.

The display panel DIS includes a liquid crystal layer formed between an upper substrate and a lower substrate. The pixel array of the display panel DIS includes pixels formed in pixel areas defined by data lines D1 to Dm and gate lines G1 to Gn, where m and n are a positive integer. Each pixel may include thin film transistors (TFTs) formed at crossings of the data lines D1 to Dm and the gate lines G1 to Gn, a pixel electrode charged to the data voltage, a storage capacitor that is connected to the pixel electrode and holds a voltage of a liquid crystal cell, and the like.

Black matrixes, color filters, etc. may be formed on the upper substrate of the display panel DIS. The lower substrate of the display panel DIS may be configured in a COT (color filter on TFT) structure. In this instance, the black matrixes and the color filters may be formed on the lower substrate of the display panel DIS. A common electrode supplied with the common voltage Vcom may be formed on the upper substrate or the lower substrate of the display panel DIS. Polarizing plates are respectively attached to the upper substrate and the lower substrate of the display panel DIS. Alignment layers for setting a pre-tilt angle of liquid crystals are respectively formed on the inner surfaces contacting the liquid crystals in the upper substrate and the lower substrate of the display panel DIS. A column spacer is formed between the upper substrate and the lower substrate of the display panel DIS to keep a cell gap of the liquid crystal cells constant.

A backlight unit may be disposed under a back surface of the display panel DIS. The backlight unit may be implemented as one of an edge type backlight unit and a direct type backlight unit and may irradiate light onto the display panel DIS. The display panel DIS may be implemented in any known mode including a twisted nematic (TN) mode, a vertical alignment (VA) mode, an in-plane switching (IPS) mode, a fringe field switching (FFS) mode, etc.

The display driver includes a data driving circuit 12, a gate driving circuit 14, and a timing controller 16. The display driver applies video data of an input image to the pixels of the display panel DIS. The data driving circuit 12 converts digital video data RGB received from the timing controller 16 into positive and negative analog gamma compensation voltages and outputs a data voltage. The data driving circuit 12 then supplies the data voltage to the data lines D1 to Dm. The gate driving circuit 14 sequentially supplies a gate pulse (or a scan pulse) synchronized with the data voltage to the gate lines G1 to Gn and selects pixel lines of the display panel DIS supplied with the data voltage.

The display driver (12, 14, and 16) may supply an AC signal having the same amplitude and the same phase as the touch driving signal Vac to the signal lines D1 to Dm and G1 to Gn during the touch period Tt, so as to minimize a parasitic capacitance between the signal lines D1 to Dm and G1 to Gn connected to the pixels and the touch sensors. In this instance, a display noise mixed in a touch sensing value can be greatly reduced, and accuracy of touch sensing can increase.

The timing controller 16 synchronizes operation timings of the data driving circuit 12 and the gate driving circuit 14 with each other based on the timing signal TSIG, such as the vertical sync signal Vsync, the horizontal sync signal Hsync, the data enable signal DE, and the external clock MCLK, received from the host system 19. The timing controller 16 generates a data timing control signal and a scan timing control signal for respectively controlling the operation timings of the data driving circuit 12 and the gate driving circuit 14 using the timing signal TSIG. The data timing control signal includes a source sampling clock SSC, a source output enable signal SOE, a polarity control signal POL, etc. The scan timing control signal includes a gate start pulse GSP, a gate shift clock GSC, a gate output enable signal GOE, etc.

The host system 19 indicates a system main body of an electronic device, to which the display device 10 according to the embodiment of the disclosure is applicable. The host system 19 may be one of a television system, a set-top box, a navigation system, a DVD player, a Blu-ray player, a personal computer (PC), a home theater system, a phone system, and other systems that include or operate in conjunction with a display. The host system 19 transmits the digital video data RGB and the timing signals Vsync, Hsync, DE, and MCLK to the timing controller 16. Further, the host system 19 may execute an application associated with touch coordinate information TDATA (XY) received from the touch driver 18.

The host system 19 generates the mode control signal MOD, that enables the display device 10 to operate in the low-speed driving mode, depending on predetermined conditions including an input of a still image, a user command, an entry of a standby mode, etc. The display device 10 may operate in the normal driving mode or the low-speed driving mode in response to the mode control signal MOD.

Figure 10:
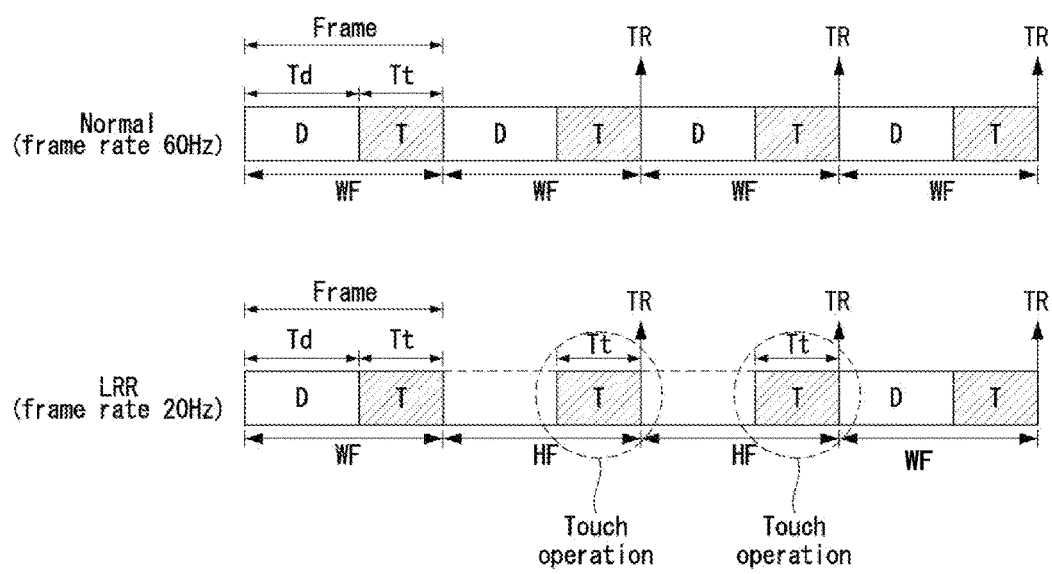
FIGS. 10 and 11 illustrate examples where a touch operation is performed in a portion of a data hold frame in a low-speed driving mode.
Figure 11:
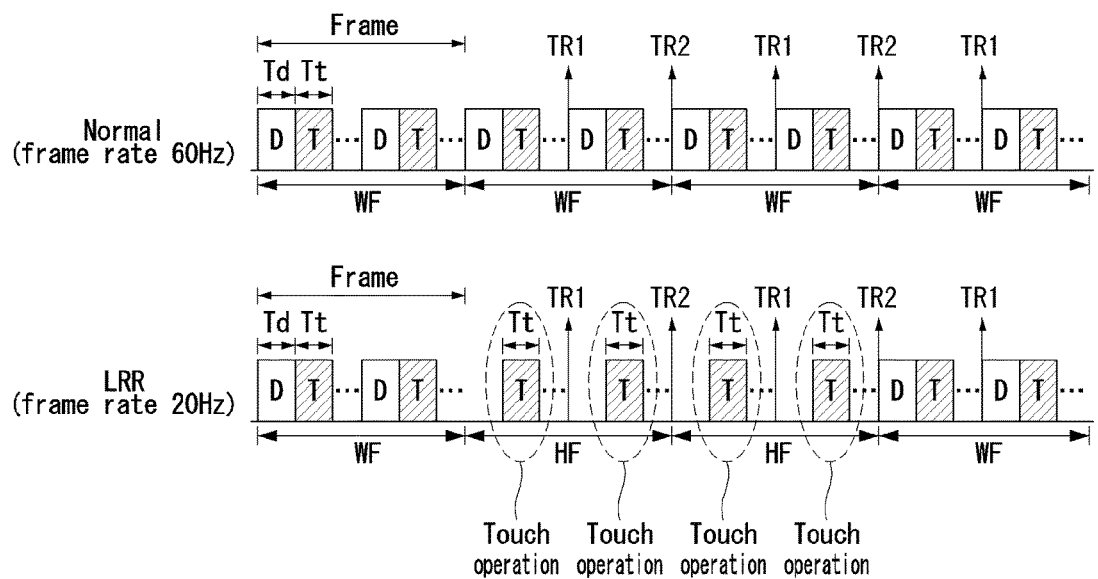

FIGS. 10 and 11 illustrate examples where a touch operation is performed in a portion of a data hold frame in a low-speed driving mode.

Referring to FIGS. 10 and 11, the embodiment of the disclosure may perform a touch operation T in touch periods Tt of data write frames WF and a portion of each data hold frame HF, in which a data write operation D is not performed, in the low-speed driving mode.

Hence, as shown in FIG. 10, the embodiment of the disclosure can control a touch report rate in the low-speed driving mode to be greater than a display frame rate (e.g., 20 Hz) in the low-speed driving mode. In FIG. 10, "TR" indicates a timing, at which a touch report is output to the host system. In an example of FIG. 10, the touch report rate in the low-speed driving mode may be 60 Hz equal to a display frame rate (e.g., 60 Hz) in the normal driving mode.

Further, as shown in FIG. 11, the embodiment of the disclosure can control a touch report rate in the low-speed driving mode to be greater than a display frame rate (e.g., 20 Hz) in the low-speed driving mode. In an example of FIG. 11, because the embodiment of the disclosure is configured such that a touch report is output twice (indicated by TR1 and TR2) during one display frame, the touch report rate in the low-speed driving mode may be 120 Hz greater than a display frame rate (e.g., 60 Hz) in the normal driving mode.

More specifically, in the normal driving mode in which a display frame rate is 60 Hz, the display driver writes pixel data to the pixel array of the display panel DIS in response to the second touch sync signal Tsync2 in display periods Td of data write frames WF, and the touch driver drives the touch sensors in response to the second touch sync signal Tsync2 in touch periods Tt of the data write frames WF. As shown in FIG. 10, when a touch report TR is output once during one display frame, a touch report rate in the normal driving mode may be 60 Hz equal to the display frame rate in the normal driving mode. On the other hand, as shown in FIG. 11, when the touch report is output twice (TR1 and TR2) during one display frame, the touch report rate in the normal driving mode may be 120 Hz greater than the display frame rate in the normal driving mode.

Further, in the low-speed driving mode in which a display frame rate is 20 Hz, the display driver writes pixel data to the pixel array of the display panel DIS in response to the first touch sync signal Tsync1 only in display periods Td of data write frames WF except the data hold frames HF. In this instance, the touch driver drives the touch sensors in response to the first touch sync signal Tsync1 in touch periods Tt of the data write frames WF and a portion (i.e., a touch period Tt) of each data hold frame HF. In the example of FIG. 10, a touch report rate in the low-speed driving mode may be 60 Hz greater than the display frame rate (e.g., 20 Hz) in the low-speed driving mode. In the example of FIG. 11, a touch report rate in the low-speed driving mode may be 120 Hz greater than the display frame rate (e.g., 20 Hz) in the low-speed driving mode.

In the example of FIG. 10, the touch report rate (e.g., 60 Hz) in the low-speed driving mode may be equal to the display frame rate (e.g., 60 Hz) in the normal driving mode. In the example of FIG. 11, the touch report rate (e.g., 120 Hz) in the low-speed driving mode may be greater than the display frame rate (e.g., 60 Hz) in the normal driving mode.

Figure 12:
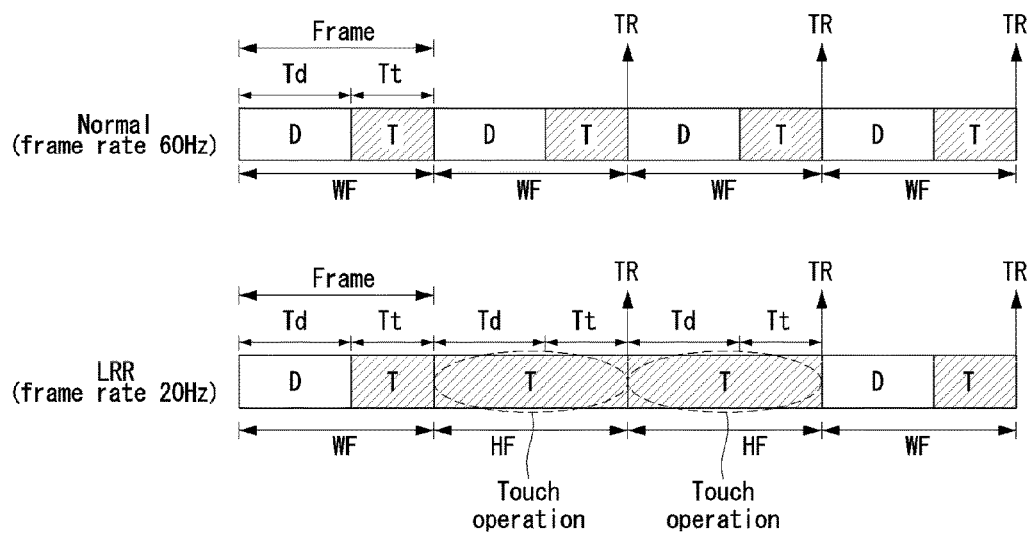
FIGS. 12 and 13 illustrate examples where a touch operation is performed in an entire duration of a data hold frame in a low-speed driving mode.
Figure 13:
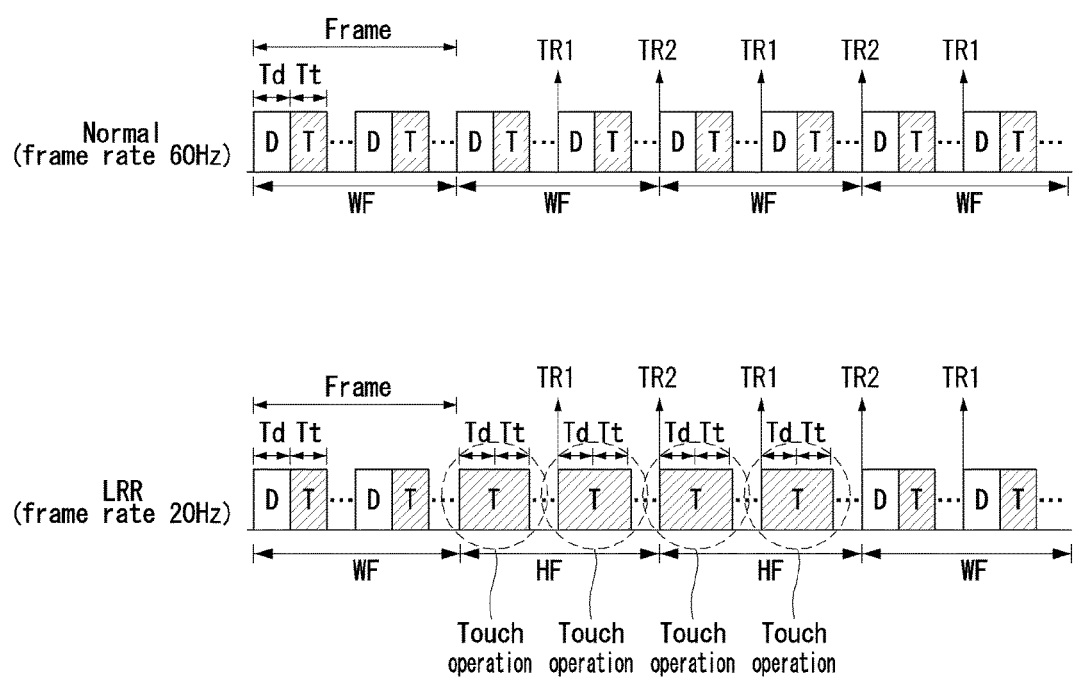

FIGS. 12 and 13 illustrate examples where a touch operation is performed in an entire duration of a data hold frame in a low-speed driving mode. Because a length of a period, in which a touch operation T can be performed, is longer in examples of FIGS. 12 and 13 than in the examples of FIGS. 10 and 11, the examples of FIGS. 12 and 13 are advantageous to improve a touch performance.

Referring to FIGS. 12 and 13, the embodiment of the disclosure may perform a touch operation T in touch periods Tt of data write frames WF and an entire duration of each data hold frame HF, in which a data write operation D is not performed, in the low-speed driving mode.

Hence, as shown in FIG. 12, the embodiment of the disclosure can control a touch report rate in the low-speed driving mode to be greater than a display frame rate (e.g., 20 Hz) in the low-speed driving mode. In FIG. 12, "TR" indicates a timing, at which a touch report is output to the host system. In an example of FIG. 12, the touch report rate in the low-speed driving mode may be 60 Hz equal to a display frame rate (e.g., 60 Hz) in the normal driving mode.

Further, as shown in FIG. 13, the embodiment of the disclosure can control a touch report rate in the low-speed driving mode to be greater than a display frame rate (e.g., 20 Hz) in the low-speed driving mode. In an example of FIG. 13, because the embodiment of the disclosure is configured such that a touch report is output twice (indicated by TR1 and TR2) during one display frame, the touch report rate in the low-speed driving mode may be 120 Hz greater than a display frame rate (e.g., 60 Hz) in the normal driving mode.

More specifically, in the normal driving mode in which a display frame rate is 60 Hz, the display driver writes pixel data to the pixel array of the display panel DIS in response to the second touch sync signal Tsync2 in display periods Td of data write frames WF, and the touch driver drives the touch sensors in response to the second touch sync signal Tsync2 in touch periods Tt of the data write frames WF. As shown in FIG. 12, when a touch report TR is output once during one display frame, a touch report rate in the normal driving mode may be 60 Hz equal to the display frame rate in the normal driving mode. On the other hand, as shown in FIG. 13, when the touch report is output twice (TR1 and TR2) during one display frame, the touch report rate in the normal driving mode may be 120 Hz greater than the display frame rate in the normal driving mode.

Further, in the low-speed driving mode in which a display frame rate is 20 Hz, the display driver writes pixel data to the pixel array of the display panel DIS in response to the first touch sync signal Tsync1 only in display periods Td of data write frames WF except the data hold frames HF. In this instance, the touch driver drives the touch sensors in response to the first touch sync signal Tsync1 in touch periods Tt of the data write frames WF and an entire duration (i.e., a display period Td and a touch period Tt) of each data hold frame HF. In an example of FIG. 12, a touch report rate in the low-speed driving mode may be 60 Hz greater than the display frame rate (e.g., 20 Hz) in the low-speed driving mode. In an example of FIG. 13, a touch report rate in the low-speed driving mode may be 120 Hz greater than the display frame rate (e.g., 20 Hz) in the low-speed driving mode.

Figure 14:
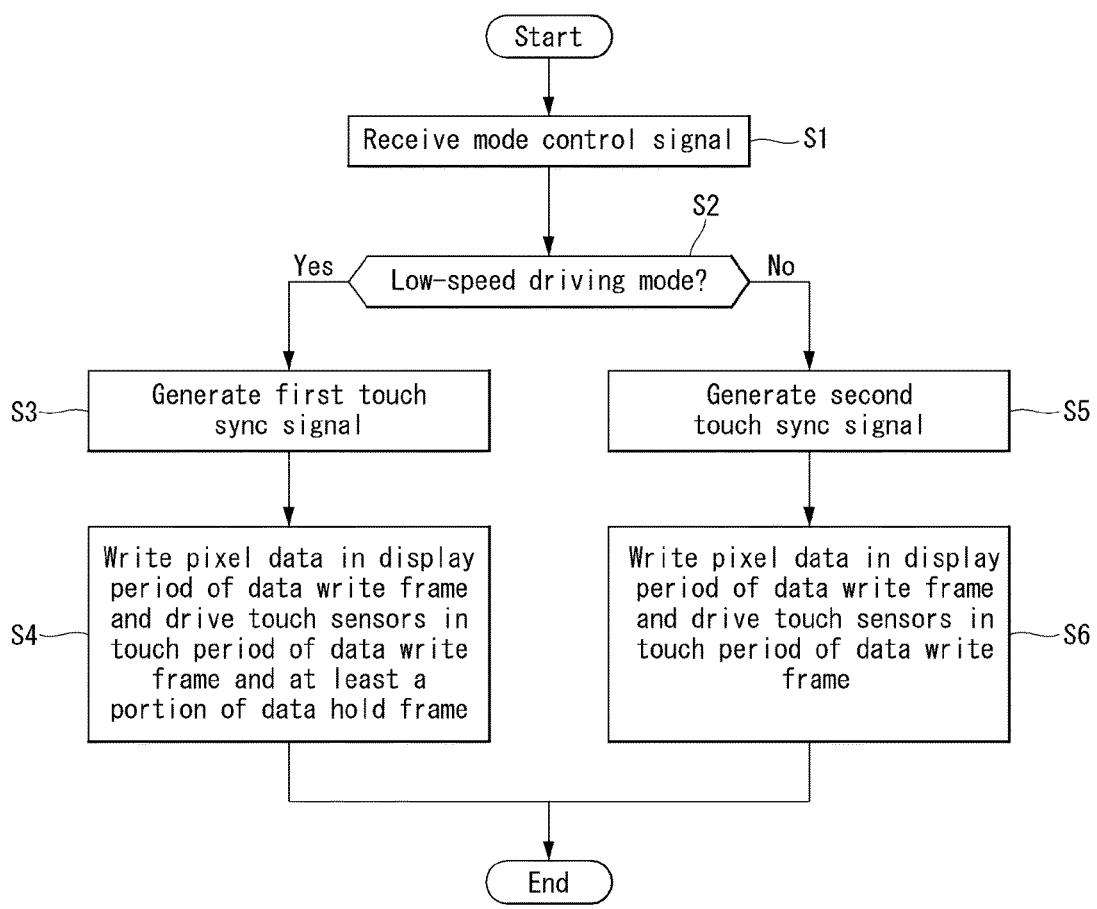
FIG. 14 is a flow chart illustrating a method of driving a display device according to an embodiment of the disclosure.

FIG. 14 is a flow chart illustrating a method of driving a display device according to an embodiment of the disclosure.

Referring to FIG. 14, the embodiment of the disclosure receives a mode control signal from the host system and determines a normal driving mode and a low-speed driving mode based on the mode control signal in steps S1 and S2.

The embodiment of the disclosure generates a first touch sync signal defining a display period and a touch period in the low-speed driving mode in step S3.

The embodiment of the disclosure writes pixel data to the pixel array of the display panel in response to the first touch sync signal only in a display period of a data write frame except a data hold frame in the low-speed driving mode in step S4. Further, the embodiment of the disclosure drives the touch sensors in response to the first touch sync signal in a touch period of a data write frame and at least a portion of a data hold frame in the low-speed driving mode in step S4.

The embodiment of the disclosure generates a second touch sync signal defining a display period and a touch period in the normal driving mode in step S5.

The embodiment of the disclosure writes pixel data to the pixel array of the display panel in response to the second touch sync signal in a display period of a data write frame in the normal driving mode in step S6. Further, the embodiment of the disclosure drives the touch sensors in response to the second touch sync signal in a touch period of a data write frame in the normal driving mode in step S6.

As described above, the embodiment of the disclosure performs a touch operation in a touch period of the data write frame and a portion (or an entire duration) of the data hold frame in the low-speed driving mode, thereby increasing a touch report rate in the low-speed driving mode. Hence, the embodiment of the disclosure can efficiently prevent a reduction in a touch performance resulting from a reduction in the touch report rate in the low-speed driving mode. Further, the embodiment of the disclosure can increase a touch performance of the low-speed driving mode to a level of a touch performance of the normal driving mode. Hence, the embodiment of the disclosure can naturally address problems of the related art including a reduction in a touch response speed, a cut phenomenon of a touch input trace, etc.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

What is claimed is:

1. A display device comprising: a display panel including a pixel array, in which touch sensors are embedded;
   a timing generator configured to determine a normal driving mode and a low-speed driving mode based on a mode control signal and generate a first touch sync signal defining a display period and a touch period in each of a plurality of display frame periods in the low-speed driving mode, in which the plurality of display frame periods including at least one data hold frame is present between data write frames;
   a display driver configured to write pixel data to the pixel array in response to the first touch sync signal only in the display periods of the data write frames in the low-speed driving mode; and
   a touch driver configured to drive the touch sensors in response to the first touch sync signal in the touch periods of the data write frames and in at least a portion of the data hold frame in the low-speed driving mode,
   wherein the data hold frame includes at least one touch period, and the pixel data is not written during the data hold frame in response to the first touch sync signal.

2. The display device of claim 1, wherein the touch driver drives the touch sensors in response to the first touch sync signal in the at least one touch period of the data hold frame in the low-speed driving mode.

3. The display device of claim 1, wherein the touch driver drives the touch sensors in response to the first touch sync signal in an entire duration of the data hold frame in the low-speed driving mode.

4. The display device of claim 1, wherein in the low-speed driving mode, the timing generator generates the first touch sync signal based on at least one of: external clock information received from an external host system, and internal clock information generated by the timing generator.

5. The display device of claim 1, wherein the timing generator is further configured to generate a second touch sync signal defining the display period and the touch period in the normal driving mode, in which only the data write frames are present,
   wherein the display driver writes the pixel data to the pixel array in response to the second touch sync signal in the display periods of the data write frames in the normal driving mode, and
   wherein the touch driver drives the touch sensors in response to the second touch sync signal in the touch periods of the data write frames in the normal driving mode.

6. The display device of claim 1, wherein the timing generator controls a touch report rate in the low-speed driving mode to be greater than a display frame rate in the low-speed driving mode.

7. The display device of claim 1, wherein the timing generator controls a touch report rate in the low-speed driving mode to be equal to or greater than a display frame rate in the normal driving mode.

8. A driving circuit of a display device including a display panel including a pixel array, in which touch sensors are embedded, the driving circuit comprising:
   a timing generator configured to determine a normal driving mode and a low-speed driving mode based on a mode control signal and generate a first touch sync signal defining a display period and a touch period in each of a plurality of display frame periods in the low-speed driving mode, in which the plurality of display frame periods including at least one data hold frame is present between data write frames;
   a display driver configured to write pixel data to the pixel array in response to the first touch sync signal only in the display periods of the data write frames in the low-speed driving mode; and
   a touch driver configured to drive the touch sensors in response to the first touch sync signal in the touch periods of the data write frames and in at least a portion of the data hold frame in the low-speed driving mode,
   wherein the data hold frame includes at least one touch period, and the pixel data is not written during the data hold frame in response to the first touch sync signal.

9. The driving circuit of the display device of claim 8, wherein the touch driver drives the touch sensors in response to the first touch sync signal in the at least one touch period of the data hold frame in the low-speed driving mode.

10. The driving circuit of the display device of claim 8, wherein the touch driver drives the touch sensors in response to the first touch sync signal in an entire duration of the data hold frame in the low-speed driving mode.

11. The driving circuit of the display device of claim 8, wherein in the low-speed driving mode, the timing generator generates the first touch sync signal based on at least one of: external clock information received from an external host system, and internal clock information generated by the timing generator.

12. The driving circuit of the display device of claim 8, wherein the timing generator is further configured to generate a second touch sync signal defining the display period and the touch period in the normal driving mode, in which only the data write frames are present,
   wherein the display driver writes the pixel data to the pixel array in response to the second touch sync signal in the display periods of the data write frames in the normal driving mode, and
   wherein the touch driver drives the touch sensors in response to the second touch sync signal in the touch periods of the data write frames in the normal driving mode.

13. The driving circuit of the display device of claim 8, wherein the timing generator controls a touch report rate in the low-speed driving mode to be greater than a display frame rate in the low-speed driving mode.

14. The driving circuit of the display device of claim 8, wherein the timing generator controls a touch report rate in the low-speed driving mode to be equal to or greater than a display frame rate in the normal driving mode.

15. A method of driving a display device including a display panel including a pixel array, in which touch sensors are embedded, the method comprising:
   determining a normal driving mode and a low-speed driving mode based on a mode control signal and generating a first touch sync signal defining a display period and a touch period in each of a plurality of display frame periods in the low-speed driving mode, in which the plurality of display frame periods including at least one data hold frame is present between data write frames;
   writing pixel data to the pixel array in response to the first touch sync signal only in the display periods of the data write frames in the low-speed driving mode; and
   driving the touch sensors in response to the first touch sync signal in the touch periods of the data write frames and in at least a portion of the data hold frame in the low-speed driving mode,
   wherein the data hold frame includes at least one touch period, and the pixel data is not written during the data hold frame in response to the first touch sync signal.

16. The method of claim 15, wherein the driving of the touch sensors in the low-speed driving mode includes driving the touch sensors in response to the first touch sync signal in the at least one touch period of the data hold frame.

17. The method of claim 15, wherein the driving of the touch sensors in the low-speed driving mode includes driving the touch sensors in response to the first touch sync signal in an entire duration of the data hold frame.

18. The method of claim 15, wherein the generating of the first touch sync signal in the low-speed driving mode includes generating the first touch sync signal based on at least one of: external clock information received from an external host system, and internal clock information generated by a timing generator.

19. The method of claim 15, further comprising generating a second touch sync signal defining the display period and the touch period in the normal driving mode, in which only the data write frames are present,
   wherein the writing of the pixel data to the pixel array in the normal driving mode includes writing the pixel data to the pixel array in response to the second touch sync signal in the display periods of the data write frames, and
   wherein the driving of the touch sensors in the normal driving mode includes driving the touch sensors in response to the second touch sync signal in the touch periods of the data write frames.

20. The method of claim 15, wherein a touch report rate in the low-speed driving mode is greater than a display frame rate in the low-speed driving mode.

21. The method of claim 15, wherein a touch report rate in the low-speed driving mode is equal to or greater than a display frame rate in the normal driving mode.

22. A display device comprising: a display panel including a pixel array, in which touch sensors and sensor lines are embedded,
   a display driver applying a video data of an input image to the pixel array of the display panel; and
   a touch driver supplying a touch driving signal to the touch sensors of the display panel, wherein the display device is selectively operable in a normal driving mode and a low-speed driving mode,
   wherein in the normal driving mode, display frames of the display device include data write frames having at least one display period and at least one touch period,
   wherein in the low-speed driving mode, display frames of the display device include data write frames having at least one display period and at least one touch period and data hold frames having and at least one touch period, wherein the pixel data is not written during the data hold frame, and
   wherein the display driver writes a pixel data to the pixel array in the at least one display period of the data write frames in the low-speed driving mode, and the touch driver drives the touch sensors in the at least one touch period of the data write frames and in at least a portion of the data hold frames in the low-speed driving mode.

23. The display device of claim 22, wherein the touch sensors include at least a first touch sensor and a second touch sensor and the sensor lines include at least a first sensor line and a second sensor line, and
   wherein the first sensor line is connected to the first touch sensor and the second sensor line is connected to the second touch sensor.

* * * * *